Patented Aug. 5, 1941

2,251,748

UNITED STATES PATENT OFFICE 2,251,748

COMPOSITION FOR TREATING AQUEOUS FLUIDS

Rowland R. Magill, Webster Groves, Mo., assignor to Hubert E. Howard, Chicago, Ill.

No Drawing. Application August 12, 1939, Serial No. 289,787

1 Claim. (Cl. 252—181)

This invention relates to a material or substance for treating water. An object of the invention is to provide an inexpensive material which may be used in the treatment of turbid water to clarify it, to render it odorless and, generally, to remove from it suspended and dissolved solids. Another object is to provide a substance or material which, when put into water, will form a floc to which the suspended and dissolved solids will attach themselves, or with which they will join to render their removal from the body of water easy. Another object is to provide a material, which, while accomplishing the above results, also, softens the water.

Other objects will appear from time to time throughout the specification and the claim.

In general, the material of this invention comprises bituminous coal, sodium aluminum tannate, ammonium ferrous sulphate and magnesium tannate. While these materials may be mixed in many different relative proportions, each to the other, one suitable mix is as follows:

| | Per cent |
|---|---|
| Coal | 70 |
| Sodium aluminum tannate | 20 |
| Ammonium ferrous sulphate | 5 |
| Magnesium tannate | 5 |

While the above table indicates a suitable proportion of the various ingredients, probably the coal may vary from ten per cent to 80 per cent of the total mix; and, correspondingly, the other ingredients would similarly vary. Satisfactory results may be obtained, therefore, when the proportions of the ingredients of the material are varied widely. The exact proportion of the several ingredients is dictated in the main by reasons of economy and by the analysis of the water which is to be treated. A mixture which is low in coal is likely to be less economical than one which is higher in coal because a larger quantity of that material per gallon of treated fluid will probably be required. The coal furnishes not merely a physical ingredient but is a source of chemical elements which react with the other ingredients to form the resultant product. It furnishes, among other things, iron and sulphur; and, after the process of mixing is completed, the coal residue present is substantially an activated carbon. The coal, thus, enters into the chemical reaction which occurs in making the product and, thereafter, is present physically and serves, among other purposes, to form a base upon which the floc which is formed in the treatment of the water starts.

Lime may or may not be used in the treatment of water with material above described. Preferably, it will be used. Its use is generally an economy and, when used, it will ordinarily be dissolved in the water which is to be treated. It will be used in varying concentrations—one fairly general concentration being approximately three grains of lime (quick or slack) per gallon of liquid treated. Where the lime is thus used, experience has shown that the material of the present invention will ordinarily give satisfactory results in the proportion of from one grain to one-quarter grain per gallon of water treated. It is to be understood throughout that the quantity of treating material and the quantity of lime will be varied by the user, dependent on the analysis of the water, and other conditions. The quantity of treating materials used must be so balanced with respect to the water that clear, soft and odorless water will be produced by the treatment.

In the past, water has been treated by the use of alum and ferrous sulphate alone, or in combination. The material of the present invention supplants the use of either, or both, of these materials.

In general, the material is used as follows:

Water to be treated is led into a suitable container or tank where material which is in ground or powdered form is fed to the water—it forms a floc. Suspended and dissolved solids attach themselves to the floc. The floc, with everything that has joined to it, is precipitated, leaving a body of clear water with the precipitate at or near the bottom. The clear water is then taken off in any desired manner. It may be filtered, chlorinated and used. It will be found that the odors have been taken up by the material; that the water has been softened and clarified. These results of the use of the material and the method disclosed occur before the water leaves the treating tank in which the material has been applied to it. They are, of course, independent of filtering and chlorinating, which are optional steps before use and may be applied, if desired. The lime is added to the water during treatment and its primary purpose is for economy. Satisfactory results may be accomplished by the use of the material of this invention without lime, but only by the use of a larger relative quantity of the material; and, hence, when lime is used, less treating material is necessary.

In its preparation the material may be compounded in a number of ways. Ordinarily, the coal will be ground or powdered; the other ingredients will be mixed with it; and, when the process is completed, the resultant material is put in bags or other suitable containers and shipped to a point of use.

I have spoken of the use of coal and have said that coal is present both as a source of materials which take part in the chemical reactions and as a source of material which assists physically in the formation of the floc. Coal is the most economical and convenient material for this purpose but my invention is not limited to coal; and any other material which would furnish those substances normally present in bituminous coal in the form in which they are present in coal might be substituted for coal.

The other ingredients which are used with the coal have in common the property that they are metallic salts, the oxides of which are insoluble in an alkaline aqueous solution. For that reason, other salts than those mentioned may be substituted and, in general, my product can be formed of coal or its equivalent and one or more metallic salts, the oxides of which are insoluble in an alkaline, aqueous solution. For that reason, the invention is not to be taken as being limited strictly to coal or to the particular other ingredients mentioned above.

While I have spoken initially of using my product and method in the treatment of water, it is not limited to that purpose or use. My invention may be applied to the clarifying of other liquids; that is to say, other aqueous solutions. Examples of these are an aqueous solution containing alcohol or containing malt or dextrines, or an aqueous solution containing oil or emulsions of oil. These are mentioned only as examples of a variety of aqueous solutions to which my product and my process are applicable. Another wide field of application is in sewage treatment and disposal. The invention is, therefore, not limited to the use upon or treatment of any particular liquid.

Where in the specification and claim I have used the expression "aqueous liquid" or "aqueous solution," it is my intention to convey the meaning that they are solutions containing water or a similar substance; and, of course, this includes a liquid containing nothing but $H_2O$ with whatever impurities may be present in it.

Where in the specification and claim I have used the word "floc," I mean a substance present in the solution but not in liquid form. This substance may be of any shape or weight or consistency or appearance, and may tend to rise or to fall or to remain suspended in the body of liquid.

I claim:

A material for treating aqueous fluids, which material comprises approximately 70 per cent finely divided coal, approximately 20 per cent sodium aluminum tannate, approximately five per cent ammonium ferrous sulphate and approximately five per cent magnesium tannate.

ROWLAND R. MAGILL.